United States Patent [19]

Loane, Jr.

[11] 4,290,809

[45] Sep. 22, 1981

[54] RAW MIX FLUX FOR CONTINUOUS CASTING OF STEEL

[75] Inventor: Charles M. Loane, Jr., Bel Air, Md.

[73] Assignee: Mobay Chemical Corporation, Pittsburgh, Pa.

[21] Appl. No.: 175,620

[22] Filed: Aug. 6, 1980

[51] Int. Cl.$^3$ .............................................. C22B 9/10
[52] U.S. Cl. ......................................... 75/257; 75/53; 164/473
[58] Field of Search ....................... 148/26; 75/53-58, 75/257; 164/56

[56] References Cited

U.S. PATENT DOCUMENTS

| | | | |
|---|---|---|---|
| 3,649,249 | 3/1972 | Halley | 148/26 |
| 3,704,744 | 12/1972 | Halley | 148/26 |
| 3,826,695 | 7/1974 | Leicher | 148/26 |
| 3,899,324 | 8/1975 | Corbett | 148/26 |
| 3,926,246 | 12/1975 | Corbett | 148/26 |
| 4,066,478 | 1/1978 | DeHaeck | 148/26 |
| 4,092,159 | 5/1978 | Uher | 75/257 |
| 4,204,864 | 5/1980 | Loane, Jr. et al. | 75/257 |
| 4,235,632 | 11/1980 | Uher et al. | 75/257 |

*Primary Examiner*—P. D. Rosenberg
*Attorney, Agent, or Firm*—Gene Harsh; Joseph C. Gil; Lyndanne M. Whalen

[57] ABSTRACT

The present invention is directed to raw mix flux for the continuous casting of steel wherein the flux composition consists of a mixture of ceramic raw material having the following theoretical analysis based on the composition formed on melting the raw materials:

$K_2O$: 0 to 5 percent by weight
$Na_2O$: 20 to 35 percent by weight
$CaO$: 5 to 25 percent by weight
$MgO$: 0 to 1 percent by weight
$Al_2O_3$: 3 to 10 percent by weight
$B_2O_3$: 15 to 30 percent by weight
$SiO_2$: 5 to 20 percent by weight
F: 10 to 25 percent by weight
$Fe_2O_3$: 0 to 1 percent by weight and wherein the percentages of said ingredients total 100 percent by weight.

4 Claims, No Drawings

RAW MIX FLUX FOR CONTINUOUS CASTING OF STEEL

BACKGROUND OF THE INVENTION

During the continuous casting of steel, and particularly aluminum-killed steel, it is desirable to prevent oxidation of the liquid metal being cast. Constituents of the melt, such as iron, aluminum, manganese, chromium, titanium and the like, are converted to oxide when exposed to air. These oxides are a source of nonmetallic inclusions in the solidified metal and can lead to serious defects. At the same time, the loss of these constituents through oxidative processes changes the composition of the resultant alloy.

To prevent such oxidation of the molten metal, fluxes are added to the mold during the continuous casting of steel. These fluxes melt to form a protective layer of liquid flux over the surface of the molten steel in the mold, thereby excluding atmospheric oxygen. In addition, this melt lubricates the walls of the mold, reducing friction between the mold and the solidifying strand of steel as it is continuously withdrawn. The liquid flux also serves to dissolve any oxides introduced into the mold with the liquid metal, thereby allowing for the production of clean, inclusion-free steel.

Characteristic of these types of fluxes are those described in U.S. Pat. Nos. 3,649,249; 3,704,744; 3,899,324; 3,926,246; 4,092,159 and 4,204,864; and U.S. application Serial Number 26,925 filed April 4, 1979, the disclosures of all of which are herein incorporated by reference.

When aluminum-killed steel is being processed, considerable amounts of aluminum oxide are dissolved into the flux. Even though only 0.04 percent aluminum may be in the steel itself, the aluminum oxide in the flux increases very significantly. Thus, a flux with no initial alumina can increase to an alumina content of 25 percent with a considerable increase in viscosity in the liquid flux. In fact, the flux may become so viscous that it no longer performs its functions of dissolving nonmetallic inclusions and of lubricating the strand being withdrawn from the mold.

When this occurs, a hole in the shell of the strand may form which would allow all of the liquid metal in the mold to escape (this is referred to as "breakout"). This problem is serious enough to cause termination of the cast and necessarily requires considerable time to return the machine to working order. Currently, there are two alternatives to avoid this problem. One option is to stop the machine and remove all molten slag or flux in the mold using skimmers. Fresh mold powder is then added and the cast is restarted. This option is, of course, somewhat hazardous and may additionally lead to scratching of the soft metallic (usually copper) lining in the mold. Such an option also exposes the metal to oxidation from the air. Finally, the portion of the cast formed during the period when the machine is stopped may well have to be discarded.

The second option is to add to the mold a very aggressive material that has high solubility for alumina and thins down the various flux. If very carefully done, this expedient may allow the cast to continue since the old flux would be removed from the mold as a lubricating film with the exiting strand. However, this technique requires good mixing to occur in the mold. Frequently, the viscous flux does not react quickly enough with the additives. The additives will then melt to a liquid that is too fluid to maintain a lubricating film and a breakout will then occur.

DESCRIPTION OF THE INVENTION

By following the present invention, it is possible to produce fluxes having Herty flowidity values of from about 16 to in excess of 20 that avoid the difficulties noted above. The fluxes of the instant invention are generally added to the mold whenever the working flux gets too viscous. Since the fluxes of the instant invention are compatible with substantially all the fluxes currently available in the art, they more readily fluidize the viscous slag or flux already in the mold. At the same time, the fluxes of the present invention have sufficient viscosity that they can be used in excess without the dangers inherent in using the more aggressive additions currently used in the art. As will become apparent, the fluxes of the instant invention have a composition unlike any other continuous casting flux known and used in the art, and are unique in both composition and operating qualities. The fluxes of the present invention are generally too fluid for use on the initial flux, but certainly could be used on the initial flux for special or unusual circumstances, such as, for example, when the steel making process used results in an unusual amount of oxide formation (especially $Al_2O_3$); for caster start-up, again when extra oxides are present or when a small mold size and fast casting speed require a low melting fluid flux.

The instant flux compositions are blends of ceramic raw materials and/or blends of such raw materials and vitreous particles. The flux composition in its broad and in its more advantageous final oxide theoretical analysis (the analysis reported is based on the theoretical slag composition formed on melting the raw materials) comprises:

| Ingredient | Broad Composition wt. % | Preferred Composition wt. % |
| --- | --- | --- |
| $K_2O$ | 0–5 | 0.25–3 |
| $Na_2O$ | 20–35 | 22–32 |
| $CaO$ | 5–25 | 6–22 |
| $MgO$ | 0–1 | 0.05–0.25 |
| $Al_2O_3$ | 3–10 | 5–9 |
| $B_2O_3$ | 15–30 | 16–27 |
| $SiO_2$ | 5–20 | 6–16 |
| F | 10–25 | 14–21 |
| $Fe_2O_3$ | 0–1 | 0–0.03 | wherein the percentages are selected to total 100%. When blended with vitreous fluxes, the above analysis should be maintained. In general, the vitreous fluxes can be used in amounts of from 0 to 60 percent by weight based on the total weight of the raw materials and the vitreous flux.

In a process for the continuous casting of steel utilizing an open-ended mold, the process is improved by covering the molten steel surface at the top of the mold with a layer of such flux composition (usually handled by scoop and maintained from one to several inches thick).

When the foregoing compositional limitations are complied with, the flux flowidity will generally be higher than that normally used for continuous casting of steel (i.e. about 16 to in excess of 20 inches measured in accordance with U.S. Pat. No. 3,649,249).

The flux compositions can be made from actual oxides or preferably, for efficiency and economy, from their conventional ceramic raw material equivalents, by merely mixing the necessary ingredients. For example, some raw materials can be used to provide one or more ingredients of the flux such as feldspar which can provide both sodium oxide as well as silicon dioxide. Similarly, sodium carbonate or calcium carbonate can be used to supply the requisite oxides (i.e. to supply sodium oxide and/or calcium oxide). Care should be taken, however, not to include substantial amounts of hydrated components because of the possible formation of volatile fluorides. It should be appreciated that high purity for the raw materials is not required and the compositions in accordance with the present invention can have the ordinary small amounts of impurities encountered in ceramic practice without serious shortcomings. Typical impurities of this kind include potassium oxide, aluminum oxide and iron oxide.

It has been found that the flux can be used in the continuous casting process by simply providing a layer on the surface of the molten metal at the top of the mold in the caster. An adequate layer of the flux usually is about 1 to 2 inches in thickness and is maintained in such thickness throughout the continuous casting process by periodic or continuous additions. Typically, the amount of the flux utilized is about 1 pound per ton and generally in the range of 0.2 to 1.5 pounds per ton of steel cast. As noted above, the fluxes of the present invention are particularly useful to add to working fluxes which have increased to too high a viscosity.

Different properties of the instant fluxes were measured by specific tests. Flowidity was measured by the method set out in U.S. Pat. No. 3,649,249. Alumina dissolution kinetics and fusion ranges were measured by special tests, the procedures for which are explained after the following Examples.

The following Examples show ways in which the invention has been practiced, but should not be construed as limiting the invention. In this application, unless otherwise especially noted, all parts are parts by weight, all percentages are weight percentages, all temperatures are in degrees Fahrenheit.

EXAMPLES

Examples 1 through 10

The raw materials noted were mixed together in the amounts shown in the following Table. The analysis shown is a theoretical slag composition formed on melting the raw materials as noted. The various properties tested were also as indicated.

| EXAMPLE | 1 | 2 | 3 | 4 | 5 | 6 | 7 | 8 | 9 | 10 |
|---|---|---|---|---|---|---|---|---|---|---|
| RAW BATCH INGREDIENTS (PARTS BY WEIGHT) | | | | | | | | | | |
| Feldspar Anhydrous | 2.5 | 1.4 | — | — | — | — | — | — | — | — |
| Borax | 26.8 | 38.1 | 26.7 | 37.6 | 22.2 | 35.2 | 25 | 37.5 | 25 | 37.5 |
| Cryolite | 13.6 | 31.4 | 13.1 | 30.3 | 17.1 | 32.6 | 25 | 37.5 | 25 | 37.5 |
| Sodium Carbonate | 14.7 | 7.5 | 15.2 | 8.2 | 22.1 | 11.7 | — | — | — | — |
| Fluorspar | 21.3 | 10.9 | 13.0 | 6.9 | 13.7 | 7.3 | — | — | — | — |
| Nepheline Syenite | 8.2 | 4.1 | — | — | — | — | — | — | — | — |
| Wollastonite | 12.9 | 6.6 | — | — | — | — | — | — | — | — |
| Silica | — | — | 13.7 | 7.3 | 14.1 | 7.5 | — | — | — | — |
| Calcium Carbonate | — | — | 14.9 | 7.9 | 5.7 | 3.0 | — | — | — | — |
| Potassium Carbonate | — | — | 1.3 | 0.7 | 3.9 | 2.1 | — | — | — | — |
| Calcium Alumina | — | — | 2.1 | 1.1 | 1.2 | 0.6 | — | — | — | — |
| Vitreous Frit A* | — | — | — | — | — | — | 50 | 25 | — | — |
| Vitreous Frit B* | — | — | — | — | — | — | — | — | 50 | 25 |
| OXIDES (PERCENT BY WEIGHT) | | | | | | | | | | |
| $K_2O$ | 0.54 | 0.26 | 0.97 | 0.48 | 2.88 | 1.40 | 0.97 | 0.48 | 2.88 | 1.40 |
| $Na_2O$ | 23.6 | 28.51 | 24.79 | 29.09 | 29.04 | 31.18 | 24.79 | 29.09 | 29.04 | 31.18 |
| CaO | 21.02 | 10.33 | 18.84 | 9.23 | 13.82 | 6.76 | 18.84 | 9.23 | 13.82 | 6.76 |
| MgO | 0.24 | 0.12 | 0.24 | 0.12 | 0.09 | 0.05 | 0.24 | 0.12 | 0.09 | 0.05 |
| $Al_2O_3$ | 5.51 | 8.08 | 5.54 | 8.04 | 5.44 | 8.0 | 5.54 | 8.04 | 5.44 | 8.0 |
| $B_2O_3$ | 18.65 | 25.36 | 20.28 | 26.18 | 16.61 | 24.39 | 20.28 | 26.18 | 16.61 | 24.39 |
| $SiO_2$ | 13.06 | 6.42 | 14.96 | 7.32 | 15.22 | 7.45 | 14.96 | 7.32 | 15.22 | 7.45 |
| $Fe_2O_3$ | 0.02 | 0.01 | — | — | — | — | — | — | — | — |
| F | 17.36 | 20.98 | 14.38 | 19.54 | 16.90 | 20.77 | 14.38 | 19.54 | 16.9 | 20.77 |
| FLOWIDITY IN INCHES | | | | | | | | | | |
|  | 17 | 20+ | 16¼ | 20+ | 20+ | 20+ | 16 | 20+ | 16¼ | 20 |
| FUSION RANGE °F. | | | | | | | | | | |
|  | 1450–1575 | 1450–1550 | 1500–1600 | 1475–1550 | 1475–1550 | 1450–1550 | 1475–1575 | 1500–1600 | 1475–1600 | 1475–1600 |
| ALUMINA DISSOLUTION KINETICS IN SECONDS | | | | | | | | | | |
|  | 87 | 48 | 63 | 46 | Not tested | Not tested | 88 | 91 | 80 | 77 |

*A: FRIT A is the vitreous frit of Example 38 of U.S. Pat. No. 4,204,864.
*B: FRIT B is the vitreous frit of Example 28 of U.S. Pat. No. 4,204,864

The test procedure used to determine the fusion ranges in the previous Examples required weighing out 3.00 grams of the sample composition. A weighed-out sample was put into a pellet mold that would produce a ½ inch (1.27 cm) diameter pellet in cylindrical form. The mold was then put into a hydraulic press and subjected to a pressure of 5,000 pounds per square inch (350 kg/cm²). The pellet formed from the sample material was placed in the center of a stainless steel plate 0.05 inch (0.127 cm) thick and 2 inches (5.08 cm) by 2 inches (5.08 cm) square. The plate with the pellet on it was then placed in a furnace capable of supporting the plate in a precisely level position (to avoid the melted composition from running off the plate). The furnace was also capable of maintaining preselected temperatures between 1500° F. (1816° C.) and 2300° F. (1260° C.). The sample was left in the furnace for exactly 3½ minutes.

Upon removal, the pellet was examined for any evidence of softening, primarily rounding of the edges. If there were such signs, the furnace temperature was taken as the lower fusion range temperature. If there were no such signs, the furnace temperature was increased to 50° F. (17.8° C.) and a new pellet was heated at the new temperature for exactly 3½ minutes. After the lower fusion range temperature was determined, the furnace temperature continued to be increased by 50° F. (17.8° C.) intervals until the upper fusion range temperature was determined. The upper temperature was evidenced by the sample flowing out into a thin melt, i.e. a puddle that had lost all cylindrical form.

The special test procedure used to determine alumina dissolution kinetics required the preparation of a graphite crucible without any drain holes. The crucible was prepared by boring a 1½ inch (3.76 cm) diameter by 5 inch (12.70 cm) deep hole in a 3 inch (7.62 cm) diameter by 6 inches (15.24) in length pure graphite electrode. Alumina tubing having an outer diameter of 3/32 inch (0.25 cm) and an inner diameter of 1/32 inch (0.092 cm) was cut into a ¾ inch (1.89 cm) segment with an abrasive-coated cut-off wheel. To hold the alumina tubing segment, a 3/32 inch (0.092 cm) diameter horizontal hole was drilled ¼ inch (0.64 cm) from the bottom of a rod 0.31 inches (0.8 cm) in diameter and 8.07 inches (20.5 cm) in length made from electrode grade graphite.

A sample of 250 grams of the composition to be tested was placed in the crucible. The crucible was heated to a temperature of 2600° F. (1427° C.) by a 7.5 KW Lepel induction furnace. While the crucible was being heated, the graphite rod containing the alumina sample was suspended over the crucible. This insured a proper warm-up period which reduced the possibility of the alumina tube fracturing upon submersion into the composition. However, the alumina was sufficiently far enough above the melting composition to avoid contact with any accidental splashes of composition such that would lead to premature alumina dissolution.

When the crucible had reached the 2600° F. (1427° C.) temperature according to an optical pyrometer reading, the sample was submerged. Within 30 seconds or less, the graphite rod was withdrawn to check if the alumina sample had fractured. Sharp irregular breaks usually near the sample tip would have indicated fracture and the necessity to start the procedure again from the beginning. If no fracturing was evident, the sample was resubmerged. At 15 second intervals, the rod was withdrawn to see if dissolution had occured. Dissolution occurred when no alumina remained in the rod. The test was run three times for each sample so that an average value could be calculated as the reported test result.

What is claimed is:

1. A flux composition, said composition being a mix of ceramic raw materials and having the following theoretical analysis based on the composition formed on melting the raw materials:

$K_2O$: 0 to 5 percent by weight
$Na_2O$: 20 to 35 percent by weight
$CaO$: 5 to 25 percent by weight
$MgO$: 0 to 1 percent by weight
$Al_2O_3$: 3 to 10 percent by weight
$B_2O_3$: 15 to 30 percent by weight
$SiO_2$: 5 to 20 percent by weight
F: 10 to 25 percent by weight
$Fe_2O_3$: 0 to 1 percent by weight and wherein the percentages of said ingredients total 100 percent by weight.

2. The flux of claim 1 further comprising a vitreous flux blended therewith.

3. The flux of claim 1 wherein said analysis comprises:

| Ingredient | Broad Composition wt. % | Preferred Composition wt. % |
|---|---|---|
| $K_2O$ | 0–5 | 0.25–3 |
| $Na_2O$ | 20–35 | 22–32 |
| $CaO$ | 5–25 | 6–22 |
| $MgO$ | 0–1 | 0.05–0.25 |
| $Al_2O_3$ | 3–10 | 5–9 |
| $B_2O_3$ | 15–30 | 16–27 |
| $SiO_2$ | 5–20 | 6–16 |
| F | 10–25 | 14–21 |
| $Fe_2O_3$ | 0–1 | 0–0.03 | wherein the percentages are selected to total 100%.

4. In a process for the continuous casting of steel wherein a pool of molten steel is maintained in the upper end of an open-ended continuous casting mold, the improvement which comprises adding intermittently to the top of said pool the flux composition of claim 1, whenever the viscosity of the working flux is too high.

* * * * *